(12) United States Patent
Yuan

(10) Patent No.: US 11,736,814 B2
(45) Date of Patent: Aug. 22, 2023

(54) IMAGE PROCESSING METHOD, STORAGE MEDIUM AND ELECTRONIC DEVICE

(71) Applicant: GUANGDONG OPPO MOBILE TELECOMMUNICATIONS CORP., LTD., Guangdong (CN)

(72) Inventor: Shilin Yuan, Guangdong (CN)

(73) Assignee: GUANGDONG OPPO MOBILE TELECOMMUNICATIONS CORP., LTD. (CN)

( * ) Notice: Subject to any disclaimer, the term of this patent is extended or adjusted under 35 U.S.C. 154(b) by 153 days.

(21) Appl. No.: 17/387,923

(22) Filed: Jul. 28, 2021

(65) Prior Publication Data

US 2021/0360152 A1 Nov. 18, 2021

Related U.S. Application Data

(63) Continuation of application No. PCT/CN2019/074482, filed on Feb. 1, 2019.

(51) Int. Cl.
*H04N 23/80* (2023.01)
*G06T 5/50* (2006.01)
*H04N 23/45* (2023.01)
*H04N 23/60* (2023.01)

(52) U.S. Cl.
CPC .............. *H04N 23/80* (2023.01); *G06T 5/50* (2013.01); *H04N 23/45* (2023.01); *H04N 23/64* (2023.01)

(58) Field of Classification Search
None
See application file for complete search history.

(56) References Cited

U.S. PATENT DOCUMENTS

| | | | | |
|---|---|---|---|---|
| 11,095,762 B2* | 8/2021 | Onyekwelu | ......... | H04M 1/0266 |
| 2015/0254810 A1* | 9/2015 | Heidrich | ................ | G06T 5/006 |
| | | | | 382/167 |
| 2015/0271392 A1* | 9/2015 | Musgrave | ............ | G09G 3/3406 |
| | | | | 348/207.11 |

(Continued)

FOREIGN PATENT DOCUMENTS

| | | | |
|---|---|---|---|
| CN | 101064771 A | 10/2007 | |
| CN | 102800091 A | 11/2012 | |

(Continued)

OTHER PUBLICATIONS

English translation of TW-201721232-A, Gao, Jun. 2017. (Year: 2017).*

(Continued)

*Primary Examiner* — James M Hannett
(74) *Attorney, Agent, or Firm* — Adsero IP

(57) ABSTRACT

An image processing method, a storage medium, and an electronic device. The electronic device comprises a display device and a camera assembly. The image processing method comprises generating at least three monochrome images through the display device using the camera assembly; selecting a monochrome image with the least interference from the at least three monochrome images as a reference image; removing interference in monochrome images other than the reference image based on the reference image; and obtaining a target image by synthesizing the reference image and the other monochrome images after removing the interference.

18 Claims, 11 Drawing Sheets

(56) References Cited

U.S. PATENT DOCUMENTS

2016/0337570 A1* 11/2016 Tan .................. G06F 3/01
2017/0084231 A1* 3/2017 Chew ............... G09G 3/20
2020/0234634 A1* 7/2020 Li .................... G09G 3/3208

FOREIGN PATENT DOCUMENTS

| CN | 105704465 A | | 6/2016 | | |
|---|---|---|---|---|---|
| CN | 105809634 A | | 7/2016 | | |
| CN | 105956538 A | | 9/2016 | | |
| CN | 106254724 A | | 12/2016 | | |
| CN | 106803872 A | * | 6/2017 | | |
| CN | 107154028 A | | 9/2017 | | |
| CN | 208386634 U | | 1/2019 | | |
| TW | 201721232 A | * | 6/2017 | ......... | G02B 27/1013 |
| WO | WO-2008085272 A1 | * | 7/2008 | ............ | H04N 7/144 |

OTHER PUBLICATIONS

English translation of CN-106803872-A Jun. 2017, Chen. (Year: 2017).*
Supplementary Search Report dated Jan. 12, 2022 From the Extended European search report(EESR) of the Application No. 19913185.5.
International Search Report and the Written Opinion dated Oct. 30, 2019 from the International Searching Authority Re. Application No. PCT/CN2019/074482.

* cited by examiner

IMAGE PROCESSING METHOD, STORAGE MEDIUM AND ELECTRONIC DEVICE

CROSS REFERENCE TO RELATED APPLICATIONS

The disclosure is a continuation of an International Application No. PCT/CN2019/074482, filed on Feb. 1, 2019, titled "IMAGE PROCESSING METHOD, STORAGE MEDIUM AND ELECTRONIC DEVICE", which is incorporated by reference in the present application in its entirety.

BACKGROUND OF DISCLOSURE

1. Field of Disclosure

The present disclosure relates to the field of electronic technology, and more particularly, to an image processing method, storage medium, and electronic device.

2. Description of Related Art

As electronic devices are increasingly equipped with a full-screen display, the traditional front camera can be put away, or alternatively be relocated beneath a display device. The front camera located beneath the display device needs to capture images through the display device. However, complex structures of the display device can interfere with the image capture of the front camera.

SUMMARY

Embodiments of the present application provide an image processing method, a storage medium, and an electronic device to improve the quality of in-display imaging.

An embodiment of the present application provides an image processing method executable by an electronic device. The electronic device comprises a display device and a camera assembly. The method comprises:
acquiring, by the camera assembly, light signals through the display device and generating at least three monochrome images based on the light signals;
selecting, from the at least three monochrome images, a monochrome image with least interference as a reference image;
removing interference in monochrome images other than the reference image based on the reference image; and
synthesizing the reference image and the interference-removed monochrome images to obtain a target image.

An embodiment of the present application further provides a storage medium having a computer program stored thereon, which, when executed by a computer, causes the computer to perform an image processing method as described above.

An embodiment of the present application further provides an electronic device comprising: a display device comprising a display surface, and a non-display surface disposed opposite the display surface;
a camera assembly comprising a lens disposed toward the non-display surface, the camera assembly is configured to capture images through the display device;
a processor connected to the camera assembly, the processor captures at least three monochrome images from images captured by the camera assembly, the processor selects, from the at least three monochrome images, a monochrome image with the least interference as a reference image, removes interference from other monochrome images based on the reference image, and synthesizes the reference image and the interference-removed monochrome images to obtain a target image.

BRIEF DESCRIPTION OF DRAWINGS

To illustrate the technical solutions more clearly in the embodiments of the present application, the following is a brief description of the accompanying drawings that need to be used in the description of the embodiments. Obviously, the drawings in the following description are only some embodiments of the present application, and other drawings may be obtained by those skilled in the art without creative work.

DETAILED DESCRIPTION OF EMBODIMENTS

Figure 1:
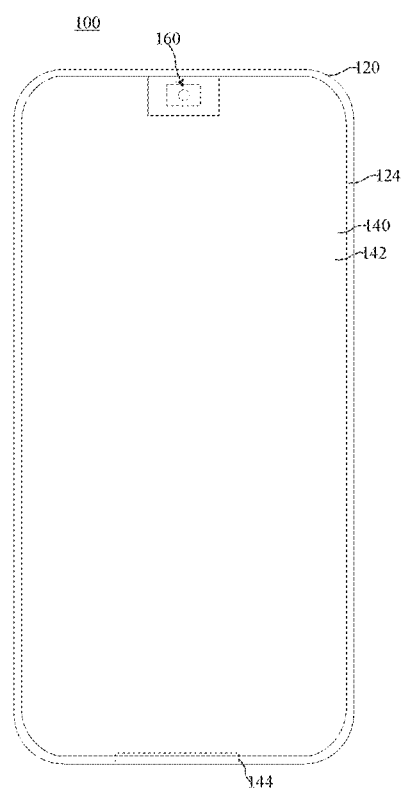
FIG. 1 is a schematic diagram showing a structure of an electronic device provided by an embodiment of the present application.

The technical solutions in the embodiments of the present application will be clearly and completely detailed in the following in conjunction with the accompanying drawings in the embodiments of the present application. Obviously, the detailed embodiments are only a part of the embodiments of the present application, and not all of them. Based on the embodiments in this application, all other embodiments obtained by a person with ordinary skills in the art without creative labor fall within the scope of claims of this application.

Embodiments of the present application provide an image processing method, and the image processing method can be executed by an electronic device. The electronic device may be a smartphone, a tablet computer, a gaming device, an augmented reality (AR) device, a car, a data storage device, an audio playback device, a video playback device, a laptop, a desktop computing device, a wearable device such as a watch, glasses, a helmet, an electronic bracelet, an electronic necklace, an electronic clothing, and other devices.

The present application provides an image processing method executable by an electronic device. The electronic device comprises a display device and a camera assembly. The method comprises:
acquiring by camera assembly light signals through the display device and generating at least three monochrome images based on the light signals;
selecting, from the at least three monochrome images, the monochrome image with the least interference as a reference image;
removing interference in monochrome images other than the reference image based on the reference image;
synthesizing the reference image and the interference-removed monochrome images to obtain a target image; and
synthesizing the reference image and the interference-removed monochrome images to obtain a target image.

In some embodiments, the synthesizing the reference image and the interference-removed monochrome images to obtain a target image comprises:
determining identical reference points in the at least three monochrome images;
obtaining, based on the reference points, a coordinate system corresponding to each monochrome image; and
synthesizing the reference image and the interference-removed monochrome images based on the reference points and coordinate system for each monochrome image to obtain a target image.

In some embodiments, the camera assembly comprises at least three monochrome cameras, and the acquiring, by the camera assembly, the light signals through the display device and generating at least three monochrome images based on the light signals comprises:
acquiring, by each monochrome camera, light signals through the display device and generating a monochrome image based on the light signals, to obtain the at least three monochrome images.

In some embodiments, selecting, from the at least three monochrome images, a monochrome image with the least interference as the reference image comprises:
determining a least-interfered monochrome camera as a target monochrome camera, the target monochrome camera has a noise threshold higher than noise thresholds of other monochrome cameras; selecting, from the at least three monochrome images, a monochrome image captured by the target monochrome camera as the reference image.

In some embodiments, the acquiring, by the camera assembly, the light signals through the display device and generating at least three monochrome images based on the light signals comprises: acquiring by camera assembly light signals through the display device and generating a raw image based on the light signals;
extracting respectively single color signals of at least three colors from the raw image; and generating a monochrome image based on each of the single color signals respectively.

In some embodiments, the acquiring, by the camera assembly, the light signals through the display device and generating at least three monochrome images based on the light signals comprises: acquiring, by the camera assembly, light signals through the display device and generating at least three monochrome images of different colors respectively based on the light signals.

In some embodiments, the selecting, from the at least three monochrome images, a monochrome image with the least interference as a reference image comprises:
determining a target wavelength with the least interference based on refractive indices of the display device for various wavelengths of light;
obtaining a corresponding target color based on the target wavelength;
selecting a corresponding monochrome image, from the at least three monochrome images, as the reference image based on the target color.

In some embodiments, the removing interference in the monochrome images other than the reference image based on the reference image comprises:
acquiring an interference region for each monochrome image other than the reference image; capturing image data for a region of the reference image corresponding to the interference region; and removing interference in the interference regions according to the image data.

In some embodiments, the acquiring, by the camera assembly, the light signals through the display device and generating at least three monochrome images based on the light signals comprises: controlling the display device to display the images when receiving a display command; controlling the display device to turn off the display when receiving a capture command, and acquiring, by the camera assembly, light signals through a light-transmissive area and generating at least three monochrome images based on the light signals.

Embodiments of the present application provide a s storage medium having a computer program stored thereon, wherein the computer program, when executed by a computer, causes the computer to perform the image processing method as detailed in any one of embodiments.

An embodiment of the present application provides an electronic device comprising:
a display device comprising a display surface, and a non-display surface disposed opposite the display surface;
a camera assembly comprising a lens disposed toward the non-display surface, the camera assembly is configured to capture images through the display device;
a processor connected to the camera assembly, the processor captures at least three monochrome images from images captured by the camera assembly, the processor selects, from the at least three monochrome images, a monochrome image with the least interference as a reference image; and removing interference from other monochrome images based on the reference image; and synthesizing the reference image and the interference-removed monochrome images to obtain a target image.

In some embodiments, the camera assembly further comprises an image sensor and at least three monochrome filters, each monochrome filter is located between the lens and the image sensor, the image sensor generating a monochrome image based on light signals through each monochrome filter.

In some embodiments, the lens comprises one lens, each of the monochrome filters is located between the lens and the image sensor, the image sensor generates a monochrome image based on light signals through the lens and each of the monochrome filters.

In some embodiments, the lens comprises at least three lenses, each of the lenses is located facing to one of the monochrome filters, the image sensor generates a monochrome image based on light signals transmitted through one of the lenses and one of the monochrome filters, respectively.

In some embodiments, the camera assembly comprises a multispectral camera, and the multispectral camera captures at least three monochrome images in a time division way.

In some embodiments, the display device further comprises a pixel definition layer, an organic light-emitting layer, a common electrode layer, and a filler layer.

The pixel definition layer comprises a plurality of pixel holes. The organic light-emitting layer comprises a plurality of organic light emitters. The plurality of organic light emitters is located correspondingly within the plurality of pixel holes. The common electrode layer covering the pixel definition layer and the organic light-emitting layer. The filler layer is located on a side of the common electrode layer away from the pixel definition layer. The filler layer comprises a plurality of fillers. Each of the fillers is located relative to one of the pixel holes. A difference between a refractive index of the pixel definition layer and a refractive index of the filler layer is less than a difference between the refractive index of the pixel definition layer and a refractive index of vacuum.

In some embodiments, the display device has a first optical path corresponding to each of monochromatic light signals at a location of the pixel hole, and the display device has a second optical path corresponding to each of the monochromatic light signals at a location of the pixel definition layer.

The processor is further configured to obtain a difference between the first optical path and the second optical path corresponding to each of the monochromatic light signals, to determine that monochromatic light signals with the smallest difference as target monochromatic light signals, and to determine that a monochromatic image corresponding to the target monochromatic light signals as the reference image.

In some embodiments, the display device comprises a light-transmissive area and a main area, where the light-transmissive area has a transmittance greater than a transmittance of the main area.

The camera assembly is located at least partially facing to the light-transmissive area. The camera assembly is configured to acquire light signals through the light-transmissive area and to generate at least three monochrome images based on the light signals.

In some embodiments, the display device comprises a first display panel and a second display panel. The first display panel has a notch. The notch penetrates the first display panel in a thickness direction of the first display panel. The second display panel is located within the notch.

The first display panel comprises the main area, and the second display panel comprises the light-transmissive area.

In some embodiments, the processor is further electrically connected to the display device.

The processor controls the light-transmissive area to turn off display when receiving a capture command, and controls the camera assembly to capture images through the light-transmissive area;

When receiving a display command rather than a capture command, the processor controls the light-transmissive area and the main area to cooperatively display images.

With reference to FIG. 1, an electronic device 100 includes a housing 120, a display device 140, and a camera 160. The display device 140 includes a display panel 142 and a driving circuit 144. The driving circuit 144 can drive the display panel 142 to display various images. The display device 140 is located on the housing 120. The housing 120 may include a back cover and a bezel 124. The bezel 124 is located around the circumference of the back cover. The display device 140 is located within the bezel 124. The display device 140 and the back cover may serve as two opposite sides of the electronic device 100. The camera 160 is located between the back cover of the housing 120 and the display device 140. Note that the camera 160 includes an image capturing surface for capturing an image, and the display device 140 includes a display surface and a display back side opposite the display surface. The image capturing surface of the camera 160 is located toward the display back side of the display device 140. The camera 160 acquires light signals through the display device 140 and obtains an image based on the acquired light signals. In some embodiments, the camera 160 may serve as a front camera of the electronic device 100, and the camera 160 may capture an image such as a selfie of the user through the display device 140. Note that the electronic device in FIG. 1 is only an example, and in some other embodiments, the electronic device may have other structures.

Figure 2:
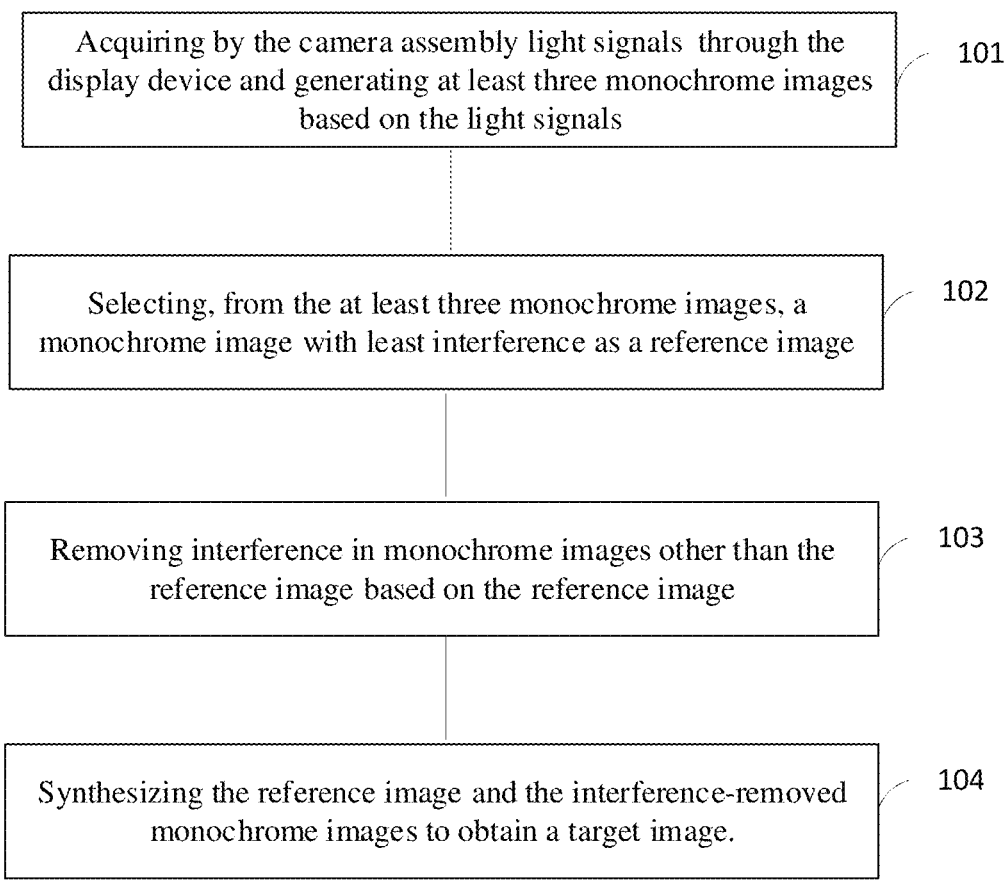
FIG. 2 is a schematic diagram showing a flow chart of an image processing method provided by an embodiment of the present application.

With reference to FIG. 2, the embodiment provides an image processing method that can be executed by an electronic device. The electronic device comprises a display device and a camera assembly. Specifically, the image processing method comprises:

101: acquiring, by the camera assembly, light signals through the display device and generating at least three monochrome images based on the light signals;

The camera assembly is located beneath the display device. Note that the camera assembly is located between the display device and the housing, and the camera assembly captures images through the display device to achieve in-display imaging.

In particular, the at least three monochrome images are monochrome images of different colors. For example, the at least three monochrome images may comprise a green image, a blue image, and a red image. Taking the green image as an example, the camera assembly has a green filter. After the ambient light signals enter the camera assembly through the display device, the green filter can filter the ambient light signals to remove other colors of light signals and retain only the green light signals, thereby obtaining a green image. The blue image can be obtained using the blue filter, and the red image can be obtained using the red filter.

102: selecting, from the at least three monochrome images, a monochrome image with least interference as a reference image;

After at least three monochrome images are obtained, the monochrome image with the least interference is selected as the reference image. For example, the monochrome image with the least interference can be obtained by testing a large amount of experimental data. Since, the display device produces different degrees of interference to light signals of different colors, the monochromatic light signals with the least interference can be selected, and thus the monochromatic image with the least interference can be selected as the reference image.

Note that the monochromatic light signals with the least interference can also be different corresponding to different display devices.

103: removing interference in monochrome images other than the reference image based on the reference image; and After obtaining the reference image with the least interference, the interference in other monochrome images that is other than the reference image can be removed based on that reference image. Specifically, an interference region in each monochrome image other than the reference image is determined, and then a target region of the reference image corresponding to the interference region is obtained, and then the target region and the interference region are compared to obtain which data in the interference region is interference. Subsequently, data that is interference in the interference region is removed to obtain the interference-removed monochrome images. For example, luminance of each pixel in the target region in the reference image and a pattern of luminance variation are obtained first, and then luminance of each pixel in the interference region in other monochrome images are obtained. Subsequently, whether the luminance of each pixel in the interference region is correct is determined based on the luminance of each pixel in the target region and the pattern of luminance variation. If the luminance of some pixels in the interference region is incorrect due to the interference, the luminance of some pixels in the interference region can be adjusted, so as to remove the interference in the interference region.

104: synthesizing the reference image and the interference-removed monochrome images to obtain a target image.

After the other interference-removed monochrome images are obtained, the other interference-removed monochrome images are then synthesized with the reference image to generate the target image. In particular, the monochrome images used for synthesis can include a red image, a green image, and a blue image, and then synthesized to form a color image according to the principle of three primary colors. The monochrome images of different colors are captured first. Because the degree of interference to the monochrome images of different colors is different, the interference of the other monochrome images is removed according to the monochrome images with the smallest degree of interference. Then, the monochrome images after the removal of interference are synthesized, which can effectively improve the quality of in-display imaging. Moreover, when capturing at least three monochrome images, each monochrome image retains only light signals of a corresponding color or a corresponding wavelength, to remove the interference from light signals of other colors or other wavelengths.

Figure 3:
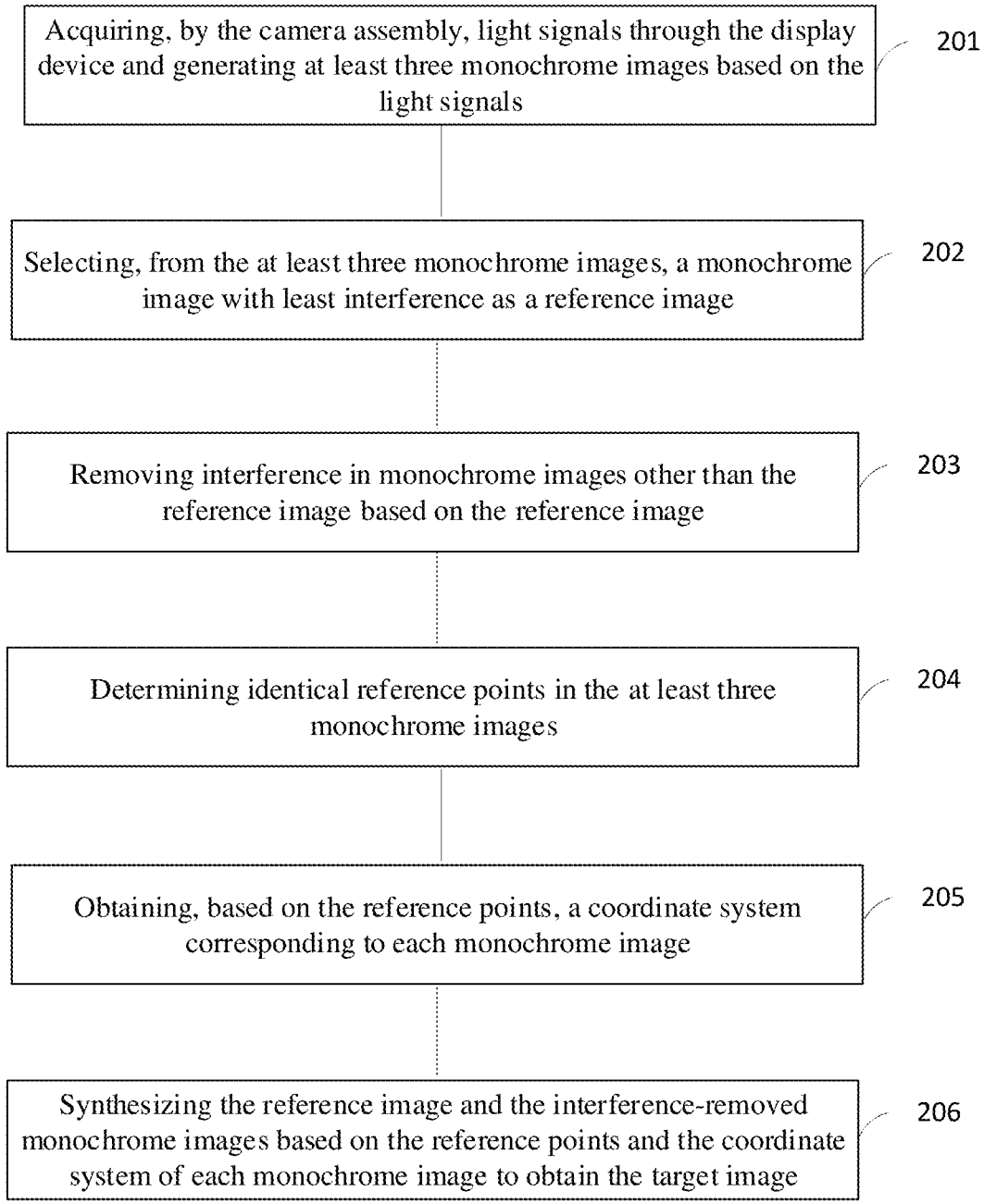
FIG. 3 is a schematic diagram showing another flow chart of the image processing method provided in an embodiment of the application.

With reference to FIG. 3, the embodiment provides another image processing method that can be executed by an electronic device. The electronic device comprises a display device and a camera assembly. Specifically, the image processing method comprises:

201: acquiring, by the camera assembly, light signals through the display device and generating at least three monochrome images based on the light signals;

The camera assembly is located below the display device. Note that the camera assembly is located between the display device and the housing, and the camera assembly captures the image through the display device to achieve in-display imaging.

In particular, the at least three monochrome images are monochrome images of different colors. For example, the at least three monochrome images may comprise a green image, a blue image, and a red image. Taking the green image as an example, the camera assembly has a green filter. After the ambient light signals enter the camera assembly through the display device, the green filter can filter the ambient light signals to remove light signals of other colors and retain only the green light signals, thereby obtaining a green image. The blue image can be obtained using the blue filter, and the red image can be obtained using the red filter.

In some embodiments, the acquiring, by the camera assembly, the light signals through the display device and generating at least three monochrome images based on the light signals comprises: controlling the display device to display the images when receiving a display command; and controlling the display device to turn off the display when receiving a capture command, and acquiring light signals through the display device using the camera assembly and generating at least three monochrome images based on the light signals.

The display unit can display images. When receiving a display command, the display device is controlled to display images normally. When receiving a capture command, the display is turned off and the camera assembly captures images through the display device.

In some embodiments, the camera assembly includes at least three monochrome cameras, and the acquiring, by the camera assembly, the light signals through the display device and generating at least three monochrome images based on the light signals comprises:

acquiring, by each monochrome camera, light signals through the display device and generating a monochrome image based on the light signals, to obtain the at least three monochrome images.

The camera assembly may include a red camera, a green camera, and a blue camera. Each of the cameras captures a corresponding monochrome image. Specifically, the red camera captures a red image through the display device, the green camera captures a green image through the display device, and the blue camera captures a blue image through the display device.

In some embodiments, the acquiring, by the camera assembly, the light signals through the display device and generating at least three monochrome images based on the light signals comprises: acquiring by camera assembly light signals through the display device and generating a raw image based on the light signals;

extracting respectively monochromatic light signals of at least three colors from the raw image; and generating a monochrome image based on each of the monochromatic light signals respectively.

The camera assembly may include a camera. The camera captures a raw image (RAW image format) through the display device, which is an unprocessed image, extracts monochromatic light signals of at least three colors from the raw image separately, and then generates a monochrome image based on each of monochromatic light signals. Consequently, at least three monochrome images, such as including a red image, a green image, and a blue image, are obtained.

In some embodiments, the acquiring, by the camera assembly, the light signals through the display device and generating at least three monochrome images based on the light signals comprises: acquiring, by the camera assembly, light signals through the display device and generating at least three monochrome images of different colors respectively based on the light signals.

The images can be captured by a multispectral camera in a time-division way. For example, a red image, a green image, and a blue image can be sequentially captured through the display device.

202: selecting, from the at least three monochrome images, a monochrome image with least interference as a reference image;

After at least three monochrome images are obtained, the monochrome image with the least interference is selected as the reference image. For example, the monochrome image with the least interference can be obtained by testing a large amount of experimental data. Since, the display device produces different degrees of interference to light signals of different colors, the monochromatic light signals with the least interference can be selected, and thus the monochromatic image with the least interference can be selected as the reference image.

Note that the monochromatic light signals with the least interference procedure can also be different corresponding to different display devices.

In some embodiments, the camera assembly includes at least three monochrome cameras. The selecting, from the at least three monochrome images, a monochrome image with the least interference as a reference image includes:
determining a least-interfered monochrome camera as a target monochrome camera, the target monochrome camera has a noise threshold higher than noise thresholds of other monochrome cameras; and
selecting, from the at least three monochrome images, a monochrome image captured by the target monochrome camera as the reference image.

First, among the three monochrome cameras, a monochrome camera with the least interference can be identified as the target monochrome camera. For example, if the green camera has the least interference, the green camera is identified as the target monochrome camera. Subsequently, the noise threshold of the target monochrome camera is set higher than noise thresholds of the other monochrome cameras. Further, the monochrome image captured by the target monochrome camera is selected from at least three monochrome images as the reference image. Since, the monochrome image captured by the target monochrome camera with a higher noise threshold has less interference, the monochrome image captured by the target monochrome camera is then used as the reference image.

In some embodiments, the selecting, from the at least three monochrome images, a monochrome image with the least interference as the reference image comprises:
determining a target wavelength with the least interference based on refractive indices of the display device for various wavelengths of light;
obtaining a corresponding target color based on the target wavelength;
selecting a corresponding monochrome image, from the at least three monochrome images, as the reference image based on the target color.

Since the refractive index of the display device differs for various wavelengths of light, in other words, pixel structures in the display device have different refractive indices for different wavelengths of light, the target wavelength with the least interference can be determined. Specifically, the display device includes a pixel hole with an organic light emitter inside the pixel hole. Light beams of different wavelengths passing through a corresponding pixel hole area and a corresponding non-pixel hole area have different values of optical path difference. The target wavelength with the smallest optical path difference is selected. Subsequently, the corresponding target color is obtained based on the target wavelength. Consequently, the corresponding monochrome image is selected, from the at least three monochrome images, as the reference image. For example, the target wavelength is 530 nm, and the corresponding target color is green according to the wavelength, thereby the green image is determined as the reference image.

In some embodiments, the display device further comprises a pixel definition layer, an organic light-emitting layer, a common electrode layer, and a filler layer. The pixel definition layer includes a plurality of pixel holes. The organic light-emitting layer includes a plurality of organic light emitters. The plurality of organic light emitters are located in the plurality of pixel holes correspondingly. The common electrode layer covers the pixel definition layer and the organic light-emitting layer. The image processing method further comprises:
obtaining a first refractive index of the light signals through the location of the pixel hole and a second refractive index of the light signals through a non-pixel hole location;
providing a filler layer relative to the pixel hole and determining materials of the filler based on the difference between the first refractive index and the second refractive index. In particular, the filler layer is located on one side of the common electrode layer away from the pixel definition layer. The filler layer includes a plurality of fillers. Each of the fillers is located relative to a pixel hole. The difference between a refractive index of the pixel definition layer and a refractive index of the filler is less than the difference between the refractive index of the pixel definition layer and a refractive index of the vacuum.

In some embodiments, a first optical path corresponding to the location of the pixel hole for each of the monochromatic light signals, and a second optical path corresponding to the non-pixel hole location are obtained.

A difference between the first optical path and the second optical path corresponding to each of monochromatic light signals is obtained, and the monochromatic light signals with the smallest difference is determined as the target monochromatic light signals.

A monochromatic image corresponding to the target monochromatic light signals is determined as the reference image.

Based on the manufacturing process of the display device, the organic light emitter does not fill the pixel hole, and a plurality of second recesses are formed on the common electrode layer that covers the pixel definition layer and the organic light-emitting layer, and each filler can fill in one of the second recesses.

In some embodiments, the display device may further include a light extraction material layer. The light extraction material layer is formed on the common electrode layer. The light extraction material layer forms a third recess corresponding to each second recess, and each filler may be filled in one of the third recesses.

The first substrate, the anode metal layer, the pixel definition layer, the common electrode layer, the light extraction material layer, and the second substrate of the display device are arranged orderly in the display device. In particular, the thicknesses of the first substrate, the anode metal layer, the common electrode layer, the light extraction material layer, and the second substrate are approximately equal at different positions. The optical path difference at each position of the display device is mainly caused by the optical path difference between the pixel definition layer and the organic light emitters. Additionally, because of the manufacturing process of the display device, the common electrode layer has a second recess relative to the organic light emitters, a filler can be provided in the second groove to improve the optical path difference between the pixel definition layer and the organic light emitters through the filler. Specifically, the first optical path can be obtained by multiplying a thickness and a refractive index of the pixel definition layer, and the second optical path can be obtained by multiplying a thickness and a refractive index of the organic light emitter. A thickness and a refractive index of the filler can be determined according to the optical path difference between the first and second optical paths. Because a thickness of the second recess is known, and the thickness of the filler cannot exceed the thickness of the second recess, so that a range of the refractive index of the filler can be determined. Consequently, the material, refractive index, and thickness of the filler can be determined. Moreover, the refractive index of each layer of the display device is different for monochromatic light of different colors. After the optical path difference has been improved by the filler, the optical path difference of the display device is still different for monochromatic light of different colors. The monochromatic light with the smallest optical path difference is selected from monochromatic light of different colors, and a monochromatic image corresponding to the monochromatic light with the smallest optical path difference is determined as the reference image.

203: removing interference in monochrome images other than the reference image based on the reference image; and After obtaining the reference image with the least interference, the interference in the other monochrome images other than the reference image can be removed based on the reference image. Specifically, the interference region in each monochrome image the reference image is determined, and the target region of the reference image corresponding to the interference region is obtained. Subsequently, the target region and the interference region are compared to obtain which data in the interference region is interference, and the data that is interference in the interference region is removed to obtain the interference-removed monochrome image. For example, luminance of each pixel in the target region and the pattern of luminance variation in the target region in the reference image are obtained first, and then the luminance of each pixel in the interference region in other monochrome images are obtained. Whether the luminance of each pixel in the interference region is correct is determined based on the luminance of each pixel in the target region and the pattern of luminance variation in the target region. If the luminance of some pixels in the interference region is incorrect due to the interference, the luminance of some pixels in the interference region can be adjusted, so as to remove the interference in the interference region.

204: determining identical reference points in the at least three monochrome images.

Each monochrome image is captured from the same scene. However, if each of the three cameras capture a monochrome image separately, because the positions of the cameras are different, any two of the monochrome images may be different, and the same reference point in each of the monochrome images needs to be determined first.

205: obtaining, based on the reference points, a coordinate system corresponding to each monochrome image.

After the reference points are obtained, the coordinate system corresponding to each monochrome image is obtained based on the reference points. Note that each coordinate system may have one reference point as the coordinate origin.

206: synthesizing the reference image and the interference-removed monochrome images based on the reference points and the coordinate system of each monochrome image to obtain the target image.

Based on the reference points and coordinate system of each monochrome image, the target image is obtained by synthesizing the reference image and the interference-removed monochrome images. In this way, a high-resolution target image is obtained.

After obtaining the other interference-removed monochrome images, the target image is obtained by synthesizing the other interference-removed monochrome images with the reference image. In particular, the monochrome images for the synthesizing can include a red image, a green image, and a blue image, and then synthesized to form a color image according to the principle of three primary colors. First, monochrome images of different colors are captured. Because monochrome images of different colors have different degrees of interference, the interference of the other monochrome images is removed according to one of the monochrome images with the smallest degree of interference, and the monochrome images after removing the interference are synthesized, which can effectively improve the quality of in-display imaging. Moreover, in capturing at least three monochrome images, each monochrome image retains only the light signals of the corresponding color or the corresponding wavelength, and the interference from other colors or other wavelength light signals can be removed.

In some embodiments, the removing interference in the monochrome images other than the reference image based on the reference image comprises:

acquiring an interference region for each monochrome image other than the reference image;

capturing image data for a region of the reference image corresponding to the interference region; and removing interference in the interference regions according to the image data.

After the reference image with the least interference is obtained, the interference in the other monochrome images other than the reference image can be removed based on the reference image. Specifically, the interference region in each of the monochrome images other than the reference image is determined, and the target region of the reference image corresponding to the interference region is obtained. Subsequently, the target region and the interference region are compared to obtain which data in the interference region is interference, and the data in the interference region determined as interference is removed to obtain the interference-removed monochrome image. For example, the luminance of each pixel in the target region in the reference image and the pattern of luminance variation in the target region in the reference image are obtained first, and then the luminance of each pixel in the interference region in other monochrome images are obtained. Subsequently, whether the luminance of each pixel in the interference region is correct is determined based on the luminance of each pixel in the target region and the pattern of luminance variation in the target region. If the luminance of some pixels in the interference region is incorrect due to the interference, the luminance of some pixels in the interference region can be adjusted, so as to remove the interference in the interference area.

Note that the monochrome images may include a yellow image in addition to a red image, a green image, and a blue image.

Figure 4:
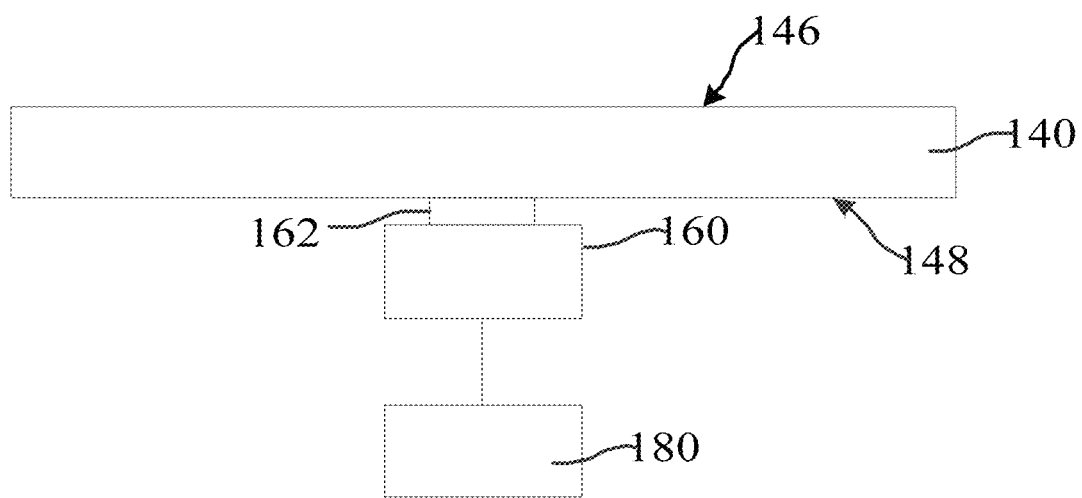
FIG. 4 is a schematic diagram showing an assembly of a portion of the electronic device provided in an embodiment of the application.

With reference to FIG. 4, and in conjunction with FIG. 2, an electronic device provided in the embodiment includes a display device 140, a camera assembly 160, and a processor 180.

The display device 140 includes a display surface 186, and a non-display surface 188 provided opposite the display surface 186. The camera assembly 160 includes a lens 162. The lens 162 is located toward the non-display surface 188. The camera assembly 160 is configured to capture images through the display device 140.

The processor 180 is connected to the camera assembly 160. The processor 180 captures at least three monochrome images from images captured by the camera assembly 160. The processor 180 selects, from the at least three monochrome images, the monochrome image with the least interference as a reference image, and removes interference from other monochrome images based on the reference image, and synthesizes the reference image and the interference-removed monochrome images to obtain a target image.

The monochrome images used for synthesis may include a red image, a green image, and a blue image, and then synthesized to form a color image according to the principle of three primary colors. Because monochrome images of different colors have different degrees of interference, the processor 180 first captures monochrome images of different colors, and removes the interference of other monochrome images according to one of monochrome images with the least degree of interference, and then synthesizes the interference-removed monochrome images, which can effectively improve the in-display imaging quality. Moreover, when capturing at least three monochrome images, each monochrome image retains only the light signals of the corresponding color or the corresponding wavelength, and the interference from other colors or other wavelength light signals can be removed.

Figure 5:
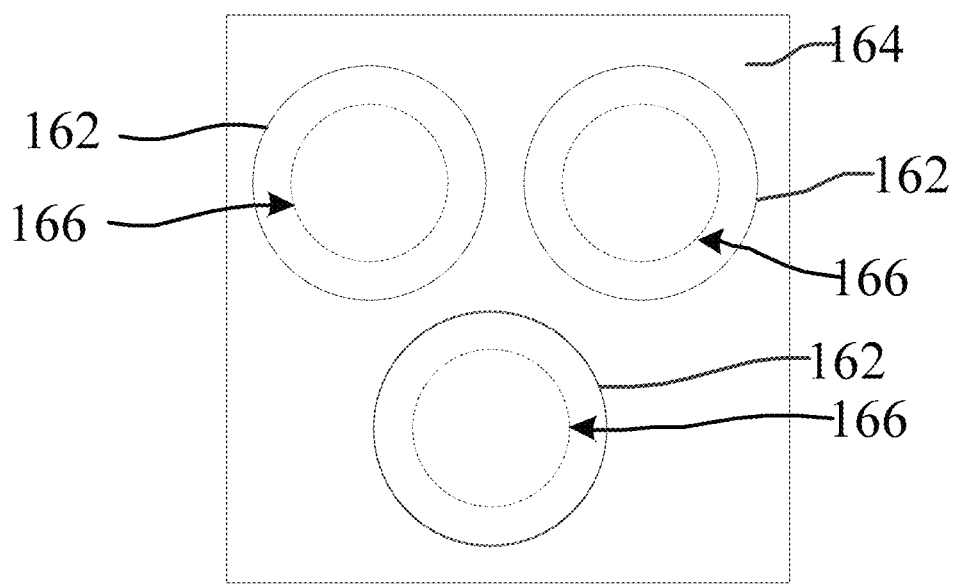
FIG. 5 is a schematic diagram showing a structure of a camera assembly of the electronic device provided in an embodiment of the application.

With reference to FIG. 5, the camera assembly 160 further includes an image sensor 164 and at least three monochrome filters 166. Each monochrome filter 166 is located between the lens 162 and the image sensor 164. The image sensor 164 generates a monochrome image based on the light signals through each monochrome filter 166.

The camera assembly 160 includes the image sensor 164, the filter 166, and the lens 162. In particular, the filter 166 comprises at least three monochrome filters 166. Each filter 166 is located between the lens 162 and the image sensor 164, so that the image sensor 164 can generate a monochrome image based on light signals through each monochrome filter 166, thereby at least three monochrome images corresponding to at least three monochrome filters 166 are obtained. In particular, the at least one monochrome filter 166 may include a red filter 166, a green filter 166, and a blue filter 166, and may further include a yellow filter 166.

In some embodiments, the lens 162 comprise at least three lenses. Each of the lenses 162 is located facing to one of the monochrome filters 166. The image sensor 164 generates a monochrome image based on light signals respectively through one of the lenses 162 and one of the monochrome filters 166.

The lens 162 comprises at least three lenses. The lenses 162 correspond to the monochrome filters 166 one by one. The image sensor 164 generates a monochrome image based on light signals through one of the lenses 162 and one of the monochrome filters 166 to obtain at least three monochrome images.

Note that the number of image sensors 164 may be the same as the monochrome filters 166, i.e., the image sensors 164 correspond to the monochrome filters 166 one by one, and at least three image sensors 164 generate at least three monochrome images.

In some embodiments, the camera assembly 160 may include three monochrome cameras. For example, the camera assembly 160 includes a red camera, a green camera, and a blue camera. In some other embodiments, the camera assembly 160 may also include at least one of a yellow camera or a black and white camera.

Figure 6:
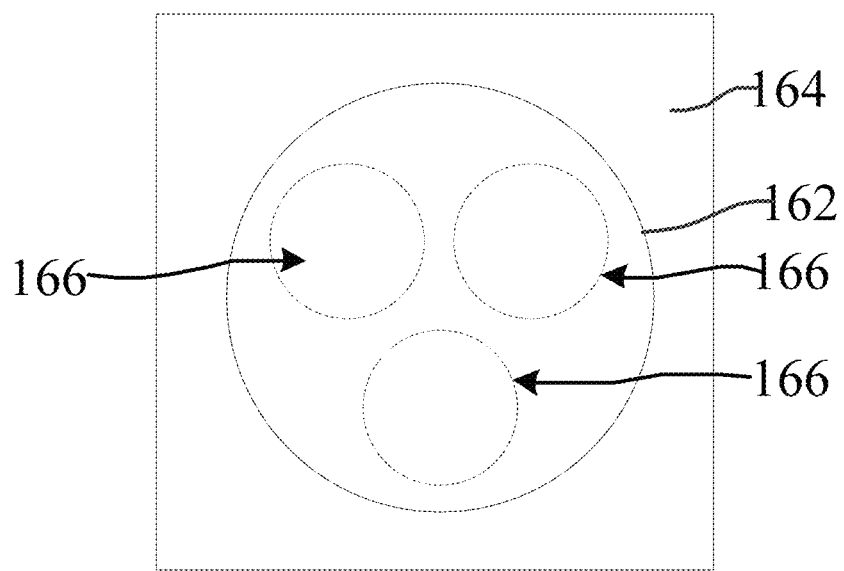
FIG. 6 is a schematic diagram showing an alternative structure of the camera assembly of the electronic device provided in an embodiment of the application.

With reference to FIG. 6, the number of lenses 162 is one, and each monochrome filter 166 is located between the lens 162 and the image sensor 164. The image sensor 164 generates a monochrome image based on light signals through the lens 162 and each monochrome filter 166.

The number of lenses 162 is one. Ambient light enters the interior of the camera assembly 160 through one large lens 162 and then passes through separate monochrome filters 166. In particular, the image sensor 164 generates one monochrome image based on light signals through each of the monochrome filters 166. One large lens 162 allows more ambient light to enter the interior of camera assembly 160.

In some embodiments, the camera assembly 160 includes a multispectral camera. The multispectral camera capturing at least three monochrome images in a time-division way.

Figure 7:
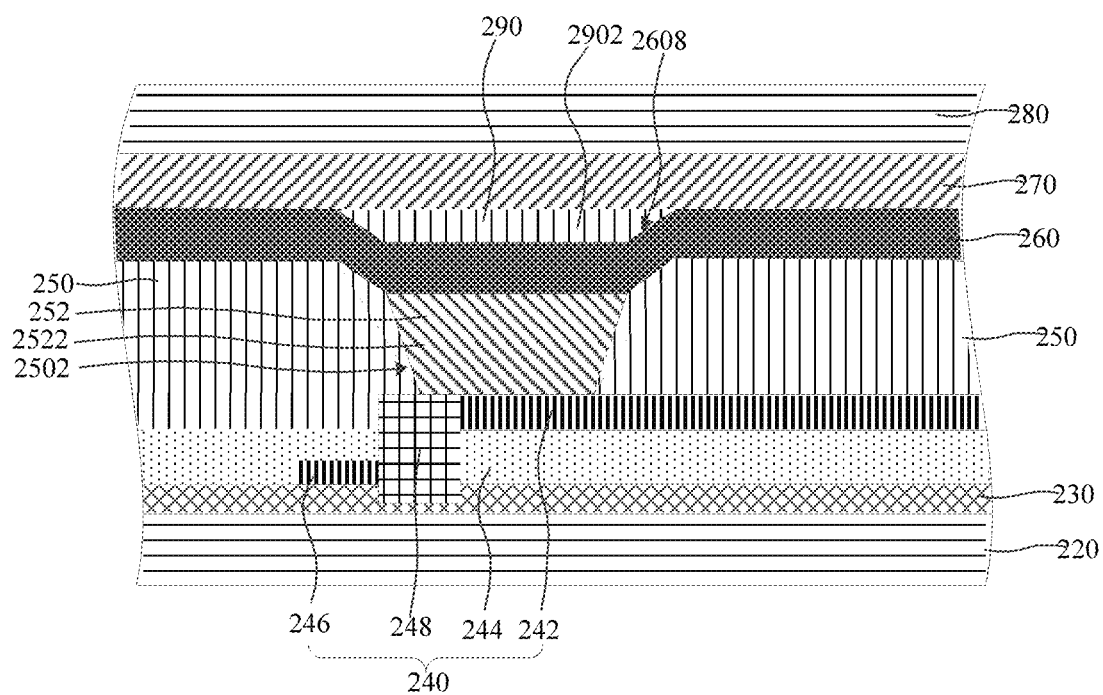
FIG. 7 is a schematic diagram showing a structure of a display device of the electronic device provided in an embodiment of the application.

With reference to FIG. 7, the display device 140 further comprises a first substrate 220, a pixel definition layer 250, an organic light-emitting layer 252, a common electrode layer 260, a filler layer 290, and a second substrate 280. In particular, the first substrate 220, the pixel definition layer 250, the common electrode layer 260, and the second substrate 280 are orderly arranged.

In particular, the pixel definition layer 250 includes a plurality of pixel holes 2502. The organic light-emitting layer 252 includes a plurality of organic light emitters 2522. The organic light emitters 2522 are located in the plurality of pixel holes 2502 correspondingly. The common electrode layer 260 covers the pixel definition layer 250 and the organic light-emitting layer 252. The filler layer 290 is located on one side of the common electrode layer 260 away from the pixel definition layer 250. The filler layer 290 comprises a plurality of fillers 2902. Each filler 2902 is located corresponding to one of the pixel hole 2502. A difference between a refractive index of the pixel definition layer 250 and a refractive index of the filler layer 290 is less than a difference between the refractive index of the pixel definition layer 250 and a refractive index of vacuum.

Specifically, the pixel definition layer 250 may include a plurality of pixel holes 2502 located in an array. The organic light-emitting layer 252 includes a plurality of organic light emitters 2522, where each organic light emitter 2522 is located within a pixel hole 2502.

Note that when light signals pass through the display device, a light signal passes through the first position of the display device corresponding to the pixel hole 2502 has a first optical path, and a light signal passes through the second position of the display device corresponding to the non-pixel hole 2502 has a second optical path, and the two light signals have an optical path difference. The common electrode layer 260 covers the organic light emitter 2522 and the pixel definition layer 250. The thickness of the common electrode layer 260 is approximately the same at various positions, and the common electrode layer 260 has no or little effect on the optical path difference. Because optical parameters of the pixel definition layer 250 and the organic light emitter 2522 are different, the pixel definition layer 250 corresponding to the non-pixel hole 2502, and the organic light emitter 2522 corresponding to the area of the pixel hole 2502 have a greater impact on the optical path difference. Additionally, in the related technology, because of the manufacturing process of the display device, a gap may be formed within the display device relative to the area of the pixel hole 2502. The gap is located on one side of the common electrode layer 260 away from the pixel hole 2502. On the other hand, the pixel definition layer 250 has no gap. The gap may have a large impact on the optical path difference. Because optical parameters of vacuum in the gap are different from optical parameters of the pixel definition layer 250, an embodiment of the application provides a filler 2902 in the gap, and a difference between a refractive index of the pixel definition layer 250 and a refractive index of the filler 2902 is less than a difference between the refractive index of the pixel definition layer 250 and a refractive index of the vacuum, which can improve the optical path difference between the first optical path and the second optical path, and thus improve the imaging quality of the camera 160 through the display device 140.

In some embodiments, the display device 140 has a first optical path at the location of the pixel hole 2502 corresponding to each of monochromatic light signals and a second optical path at the location of the pixel definition layer 250 of the display device 140 corresponding to each of the monochromatic light signals.

The processor is further configured to obtain a difference between the first optical path and the second optical path corresponding to each of the monochromatic light signals, to determine monochromatic light signals with the smallest difference as the target monochromatic light signals, and to determine a monochromatic image corresponding to the target monochromatic light signals as the reference image.

In some embodiments, the common electrode layer 260 has a plurality of second recesses 2608. Openings of the plurality of second recesses 2608 face the second substrate 280. Each of second recesses 2608 faces a pixel hole 2502. Each filler 2902 is located within one of the second recesses 2608.

The organic light emitter 2522 does not completely fill the pixel hole 2502, so that a surface of the organic light emitter 2522 facing the common electrode layer 260 and a side wall of the pixel hole 2502 cooperatively form a pixel recess. The common electrode layer 260 covers the pixel definition layer 250 and the organic light emitter 2522, and the common electrode layer 260 forms a second recess 2608 corresponding to each pixel recess. The fillers 2902 of the filler layer 290 may be provided in a plurality of second recesses, i.e., each filler 2902 is located in a second recess 2608.

The filler 2902 may fill the second recess 2608, i.e., a surface of the filler 2902 facing the second substrate is flush with a surface of the common electrode layer 260 facing the second substrate. Alternatively, the filler 2902 may not completely fill the second recess 2608 based on the optical path difference, i.e., the surface of the filler 2902 facing the second substrate is lower than the surface of the common electrode layer 260 facing the second substrate.

In some embodiments, the filler layer further includes a connector. The connector covers the common electrode layer and is connected to a plurality of fillers.

The filler fills the second recess. The connector may cover the entire layer, i.e., the connector covers the entire common electrode layer and the fillers. In particular, if the filler just completely fills the second recess, the two opposite sides of the connector are parallel.

Figure 8:
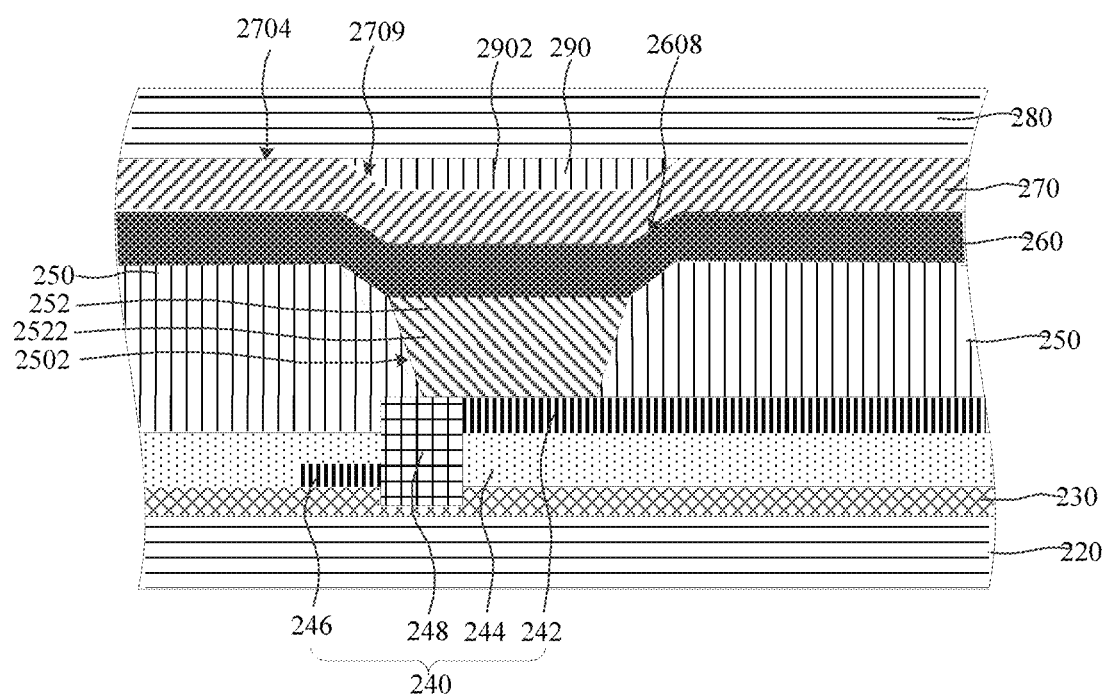
FIG. 8 is a schematic diagram showing an alternative structure of the display device of the electronic device provided in an embodiment of the application.

With reference to FIG. 8, in some embodiments, the light extraction material layer 270 has a plurality of third recesses 2709. Openings of the plurality of third recesses 2709 face the second substrate 280. Each third recess 2709 faces a pixel hole 2502. Each filler 2902 is located in one of the third recesses 2709.

Corresponding to the second recess 2608 of the common electrode layer 260, the light extraction material layer 270 has a third recess 2709. The filler 2902 is located in the third recess 2709 with less impact on the structure of the original display device 140.

In some embodiments, the light extraction material layer 270 includes a third surface 2704 away from the common electrode layer 260, and the surface of the filler 2902 away from the organic light emitter 2522 is flush with the third surface 2704.

The filler 2902 can completely fill the third recess 2709 to facilitate other structures evenly covering the light extraction material layer 270.

In some embodiments, the light extraction material layer 270 includes a third surface 2704 away from the common electrode layer 260, and the surface of the filler 2902 away from the organic light emitter 2522 is lower than the third surface 2704.

The filler 2902 fill may be filled within the third recess 2709, and depending on its optical parameters may not completely fill the third recess 2709 without affecting other structures covering the light extraction material layer 270.

Figure 9:
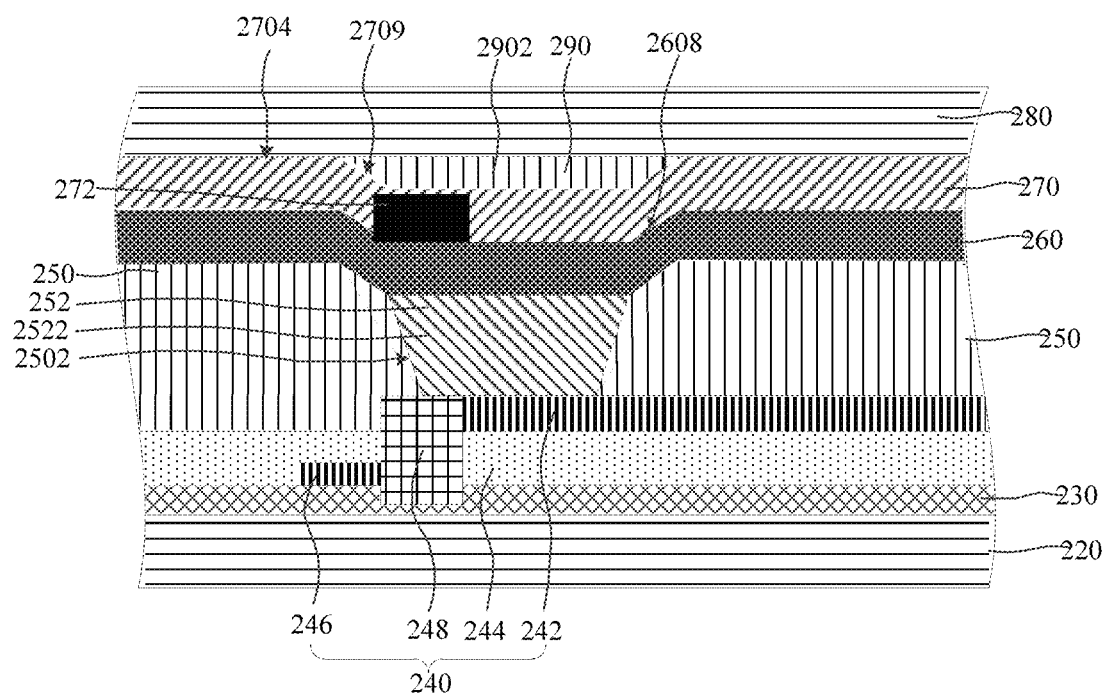
FIG. 9 is a schematic diagram showing a further alternative structure of the display device of the electronic device provided by an embodiment of the application.

With reference to FIG. 9, in some embodiments, the display device 140 may include a first substrate 220, an anode metal layer 240, a pixel definition layer 250, a common electrode layer 260, a light extraction material layer 270, and a second substrate 280 arranged orderly.

Specifically, the anode metal layer 240 includes a thin film transistor 248. The pixel definition layer 250 includes a plurality of pixel holes 2502 arranged in an array. Each pixel hole 2502 has an organic light emitter 2522 provided therein. Each organic light emitter 2522 is connected to a thin film transistor 248.

A shading block 272 is located between the second substrate 280 and each organic light emitter 2522. Each shading block 272 is at least partially provided facing to a thin film transistor 248.

The camera assembly is at least partially provided facing to the pixel hole 2502 and captures images through the display device. The shading block 272 is configured to block the ambient light transmitted onto the thin film transistor 248 while the camera is capturing images.

In particular, the shading block 272 may be a black or dark-colored material. The shading block 272 may be configured to block light entering the display device 140 and irradiating to the thin film transistor 248. The light can be prevented from entering the display device 140 and being reflected and refracted by the thin film transistor 248, and thereby stray light is prevented from interfering with the imaging and improving the quality of the in-display imaging.

In some embodiments, the light block 272 is in the light extraction material layer 270. The light extraction material layer 270 may have a plurality of first through-holes, where each first through-hole is located relative to a thin film transistor 248, with each light block 272 is located within one of the first through-holes.

The light extraction material layer 270 may also have a plurality of first recesses, where each first recess is located relative to one thin film transistor 248. Each first recess has an opening facing the first substrate 220 or the second substrate 280. Each shading block 272 is located in a corresponding first recess.

In some embodiments, the shading block 272 has a first projection on the first substrate 220, and the thin film transistor 248 has a second projection on the first substrate 220. The second projection is within the first projection. The second projection of the thin film transistor 248 on the first substrate 220 is located within the first projection of the shading block 272 on the first substrate 220. In other words, the shading block 272 is located directly above the thin film transistor 248, and the area of the shading block 272 is larger than the area of the thin film transistor 248, and the shading block 272 can completely block the ambient light incident perpendicularly to the thin film transistor 248.

Note that the display device provided with the light block can have the filler layer provided in the second recess of the common electrode layer, or the filler layer can be provided in the third recess of the light extraction material layer, and the display device provided with the light block can alternatively have no filler layer.

In some embodiments, the driving circuit layer 240 of the display device provided on the first substrate 220 further includes a first anode metal layer 242, a planarization layer 244, and a second anode metal layer 246 arranged orderly. The first anode metal layer 242, the second anode metal layer 246, and the organic light-emitting layer 252 are connected to different electrodes of the thin film transistor 248. The first anode metal layer 242 and the second anode metal layer 246 uses the thin film transistor 248 to control whether to provide a positive signal to the organic light-emitting layer 252. Additionally, when the organic light-emitting layer 252 is provided with a positive signal, the negative electrode provided by the common electrode layer 260 realizes control of whether the organic light-emitting layer 252 emits light.

In some embodiments, the display device also includes a thin film 230. The thin film 230 is located between the first substrate 220 and the anode metal layer 240. The film 230 may be made of SiNx or SiO2.

Figure 10:
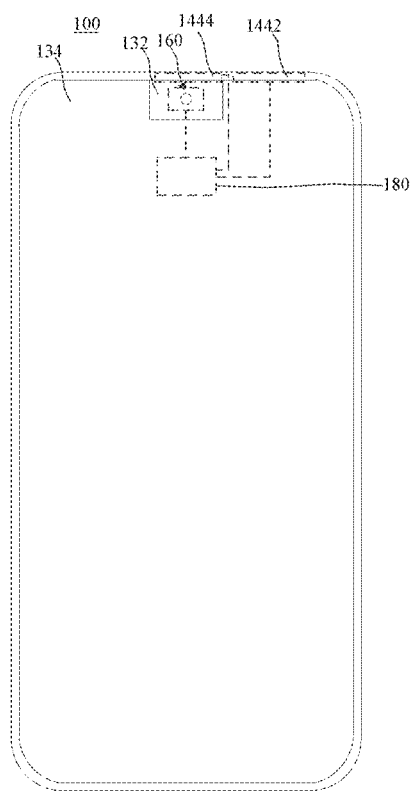
FIG. 10 is a schematic diagram showing an alternative structure of the electronic device provided by an embodiment of the application.

With reference to FIG. 10, in some embodiments, the display device 140 includes a light-transmissive area 132 and a main area 134. The light-transmissive area 132 is smaller than the main area 134. A transmittance of the light-transmissive area 132 is larger than a transmittance of the main area 134. The camera assembly is at least partially provided facing to the light-transmissive area. The camera assembly is configured to acquire light signals through the light-transmissive area and generate at least three monochrome images based on the light signals.

The light-transmissive area 132 is connected to the first driving module 1444. The main area 134 is connected to the second driving module 1442. The first driving module 1444 drives the light-transmissive area 132 of the display device 140, and the second driving module 1442 driving the main area 134 of the display device 140. Specifically, the first driving module 1442 and the second driving module 1444 can cooperate in driving so that the light-transmissive area 132 and the main area 134 cooperatively display the same image. For example, the light-transmissive area 132 displays a part of the image, the main area 134 displays the remaining part of the image. When the light-transmissive area 132 is required for capturing an image, the first driving module 1444 drives the light-transmissive area 132 to turn off the display, and the second driving module 1442 can continue to drive the main area 134 to display the image, thus, to obtain light signals from the outside world through the light-transmissive area 132 that turns off the display, and obtain the image based on the light signals.

In some embodiments, a distribution density of the pixel holes 2 in the light-transmissive area is smaller than a distribution density of the pixel holes in the main area.

In some embodiments, a first portion 254 is located at an end of the pixel definition layer 250. Specifically, the first portion 254 may be located at the top or bottom or a side of the pixel definition layer 250. For example, if the pixel definition layer 250 is a rectangle, and a second portion 256 is a rectangle with a notch, and the first portion 254 is located within the notch. The notch may be provided at the top, bottom, or edge of the second portion 256. Of course, the first portion 254 may alternatively be located in the middle of the pixel definition layer 250. Specifically, the second portion 256 has a through-hole penetrating the second portion 256 in a thickness direction, and the first portion 254 is located within the through-hole.

In particular, the light-transmissive area and the main area differ mainly in the pixel definition layer 250. The light-transmissive area and the main area may share the same first substrate 220 and second substrate 280. The filler layer 290 may be provided only in the light-transmissive area or alternatively in both the light-transmissive area and the main area.

Note that the anode metal layer corresponding to the light-transmissive area 132 can be made of a highly light-transmitting material, such as ITO, nano-silver, and others. The anode metal layer corresponding to the main area 134 can be made of a material with high transmittance, a material with low transmittance, or opaque materials.

Figure 11:
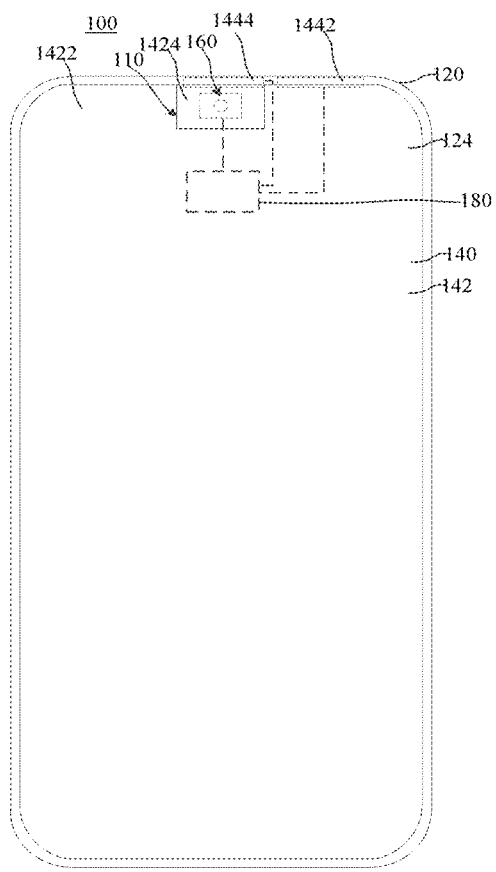
FIG. 11 is a schematic diagram showing a further alternative structure of the electronic device provided in an embodiment of the application.

With reference to FIG. 11, in some embodiments, the display device 140 may include a first display panel 1422 and a second display panel 1424. The first display panel 1422 has a notch 110. The notch 110 penetrates the first display panel 1422 in a thickness direction of the first display panel 1422. The first display panel 1422 is a display panel 142 for normal display. The second display panel 1424 is located within the notch 110. The second display panel 1424 corresponds to the light-transmissive area of the display device 140. The first display panel 1422 corresponds to the main area of the display device 140. The camera can be configured to capture images through the second display panel 1424.

The first display panel 1422 and the second display panel 1424 are two separate display panels. The first display panel 1422 and the second display panel 1424 are first manufactured separately, and the second display panel 1424 is placed inside the notch 110 of the first display panel 1422.

Note that the first display panel 1422 is connected to the second driving module 1442, and the second display panel 1424 is connected to the first driving module 1444. The first driving module 1444 drives the second display panel 1424. The second driving module 1442 drives the first display panel 1422. The first driving module 1442 and the second driving module 1444 cooperate in driving so that the first display panel 1422 and the second display panel 1424 together display the same image. For example, the first display panel 1422 displays a portion of the image, the second display panel 1424 displays the remaining portion of the image. When the second display panel 1424 is required for capturing an image, the first driving module 1444 drives the second display panel 1424 to turn off the display, and the second driving module 1442 can continue to drive the first display panel 1422 to display the image, thus, to acquire light signals from the ambient environment through the second display panel 1424 that turns off the display, and obtain the image based on the light signals.

In some embodiments, the display device 140 and the camera assembly 160 of the electronic device 100 are both electrically connected to the processor 180.

When receiving a capture command, the processor 180 controls the light-transmissive area 132 to turn off the display and controls the camera assembly 160 to capture images through the light-transmissive area 132.

When receiving a display command rather than the capture command, the processor 180 controls the light-transmissive area 132 and the main area 134 to cooperatively display an image.

The image processing method, storage medium, and electronic device provided in embodiments of the application are detailed above. Specific examples have been used herein to illustrate the principles and embodiments of this application, and the above description of embodiments is merely for facilitating understanding of this application. Additionally, a technical person in the field, according to the principles of the application, may change the specific embodiments and the scope of applications. In summary, the content of the specification should not be understood as a limitation of this application.

What is claimed is:

1. An image processing method executable by an electronic device with a display device and a camera assembly, comprising:
   acquiring, by the camera assembly, light signals through the display device; and
   generating at least three monochrome images based on the light signals;
   selecting, from the at least three monochrome images, a monochrome image with least interference as a reference image;
   removing interference in monochrome images other than the reference image based on the reference image; and
   synthesizing the reference image and the interference-removed monochrome images to obtain a target image;
   wherein the removing interference in the monochrome images other than the reference image based on the reference image comprises:
   acquiring an interference region for each monochrome image other than the reference image;
   capturing image data for a region of the reference image corresponding to the interference region; and
   removing interference in the interference regions according to the image data.

2. The image processing method according to claim 1, wherein the synthesizing the reference image and the interference-removed monochrome images to obtain the target image comprises:
   determining identical reference points in the at least three monochrome images;
   obtaining, based on the reference points, a coordinate system corresponding to each monochrome image; and
   synthesizing the reference image and the interference-removed monochrome images based on the reference points and the coordinate system of each monochrome image to obtain the target image.

3. The image processing method according to claim 1, wherein the camera assembly comprises at least three monochrome cameras, and the acquiring, by the camera assembly, the light signals through the display device and generating at least three monochrome images based on the light signals comprises:
   acquiring, by each of the at least three monochrome cameras, light signals through the display device; and
   generating a monochrome image based on the light signals acquired by each of the at least three monochrome cameras, to obtain the at least three monochrome images.

4. The image processing method according to claim 3, wherein the selecting, from the at least three monochrome images, a monochrome image with the least interference as the reference image comprises:
   determining a least-interfered monochrome camera as a target monochrome camera, the target monochrome camera has a noise threshold higher than noise thresholds of other monochrome cameras; and
   selecting, from the at least three monochrome images, a monochrome image captured by the target monochrome camera as the reference image.

5. The image processing method according to claim 1, wherein the acquiring, by the camera assembly, the light signals through the display device and generating at least three monochrome images based on the light signals comprises:
   acquiring, by the camera assembly, light signals through the display device;
   generating a raw image based on the light signals
   extracting respectively monochromatic light signals of at least three colors from the raw image; and
   generating a monochrome image based on each of the monochromatic light signals to obtain the at least three monochrome images.

6. The image processing method according to claim 1, wherein the acquiring, by the camera assembly, the light signals through the display device and generating at least three monochrome images based on the light signals comprises:
   acquiring, by the camera assembly, light signals through the display device and generating at least three monochrome images of different colors respectively based on the light signals.

7. The image processing method according to claim 1, wherein the selecting, from the at least three monochrome images, a monochrome image with the least interference as a reference image comprises:
   determining a target wavelength with the least interference based on refractive indices of the display device for various wavelengths of light;
   obtaining a corresponding target color based on the target wavelength; and
   selecting a corresponding monochrome image from the at least three monochrome images as the reference image based on the target color.

8. The image processing method according to claim 1, wherein the acquiring, by the camera assembly, the light signals through the display device and generating at least three monochrome images based on the light signals comprises:
   controlling the display device to display the images when receiving a display command; and
   controlling the display device to turn off the display when receiving a capture command, and acquiring, by the camera assembly, light signals through a light-transmissive area, and generating at least three monochrome images based on the light signals.

9. An electronic device comprising:
   a display device comprising a display surface, and a non-display surface disposed opposite the display surface;
   a camera assembly comprising a lens disposed toward the non-display surface, the camera assembly is configured to capture images through the display device; and
   a processor connected to the camera assembly, wherein the processor is configured to:
   capture at least three monochrome images from images captured by the camera assembly,
   select from the at least three monochrome images, a monochrome image with the least interference as a reference image,
   remove interference from other monochrome images based on the reference image, and synthesize the reference image and the interference-removed monochrome images to obtain a target image;
   wherein the camera assembly further comprises an image sensor and at least three monochrome filters, each of the monochrome filters is located between the lens and the image sensor, the image sensor generates a monochrome image based on light signals through each of the monochrome filters.

10. The electronic device according to claim 9, wherein the lens comprises one lens, each of the monochrome filters is located between the lens and the image sensor, the image sensor generates a monochrome image based on light signals through the lens and each of the monochrome filters.

11. The electronic device according to claim 9, wherein the lens comprises at least three lenses, each of the lenses is located facing to one of the monochrome filters, the image sensor generates monochrome images based on light signals transmitted through each of the lenses and each of the monochrome filters.

12. The electronic device according to claim 9, wherein the camera assembly comprises a multispectral camera, and the multispectral camera captures at least three monochrome images in a time division way.

13. The electronic device according to claim 9, wherein the display device further comprises a pixel definition layer, an organic light-emitting layer, a common electrode layer, and a filler layer; wherein
the pixel definition layer comprises a plurality of pixel holes,
the organic light-emitting layer comprises a plurality of organic light emitters, the plurality of organic light emitters is located correspondingly within the plurality of pixel holes,
the common electrode layer covers the pixel definition layer and the organic light-emitting layer,
the filler layer is located on a side of the common electrode layer away from the pixel definition layer, the filler layer comprises a plurality of fillers, each of the fillers is located relative to one of the pixel holes,
a difference between a refractive index of the pixel definition layer and a refractive index of the filler layer is less than a difference between the refractive index of the pixel definition layer and a refractive index of vacuum.

14. The electronic device according to claim 13, wherein the display device has a first optical path corresponding to each of monochromatic light signals at a location of the pixel hole, and the display device has a second optical path corresponding to each of the monochromatic light signals at a location of the pixel definition layer, wherein the processor is further configured to:
obtain a difference between the first optical path and the second optical path corresponding to each of the monochromatic light signals,
determine a monochromatic light signals with smallest difference as a target monochromatic light signals, and
determine a monochromatic image corresponding to the target monochromatic light signals as the reference image.

15. The electronic device according to claim 9, wherein the display device comprises a light-transmissive area and a main area, the light-transmissive area has a transmittance greater than a transmittance of the main area; and
the camera assembly is located at least partially facing to the light-transmissive area, and the camera assembly is configured to acquire light signals through the light-transmissive area and to generate the at least three monochrome images based on the light signals.

16. The electronic device according to claim 15, wherein the display device comprises a first display panel and a second display panel, the first display panel has a notch, the notch penetrates the first display panel in a thickness direction of the first display panel, the second display panel is located within the notch; and
the first display panel comprises the main area, and the second display panel comprises the light-transmissive area.

17. The electronic device according to claim 15, characterized in that the processor is further electrically connected to the display device;
when receiving a capture command, the processor controls the light-transmissive area to turn off display and controls the camera assembly to capture images through the light-transmissive area; and
when receiving a display command rather than the capture command, the processor controls the light-transmissive area and the main area to cooperatively display images.

18. An image processing method executable by an electronic device with a display device and a camera assembly, comprising:
acquiring, by the camera assembly, light signals through the display device, wherein the camera assembly further comprises an image sensor and at least three monochrome filters, each of the monochrome filters is located between the lens and the image sensor; and
generating at least three monochrome images based on the light signals, wherein the image sensor generates a monochrome image based on light signals through each of the monochrome filters to form the at least three monochrome images;
selecting, from the at least three monochrome images, a monochrome image with least interference as a reference image;
removing interference in monochrome images other than the reference image based on the reference image; and
synthesizing the reference image and the interference-removed monochrome images to obtain a target image.

* * * * *